A. AND W. OTTO.
AIR AND GAS VALVE.
APPLICATION FILED MAY 27, 1919.
1,339,665.
Patented May 11, 1920.
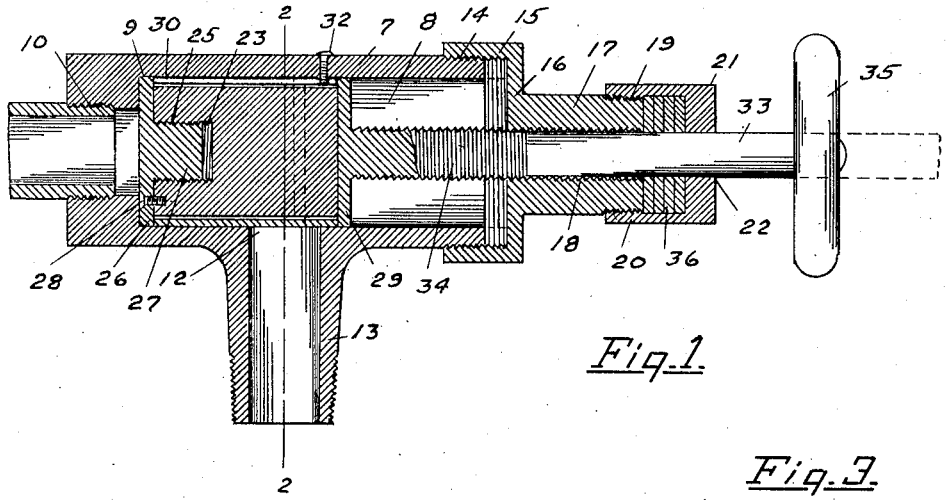
Fig.1.
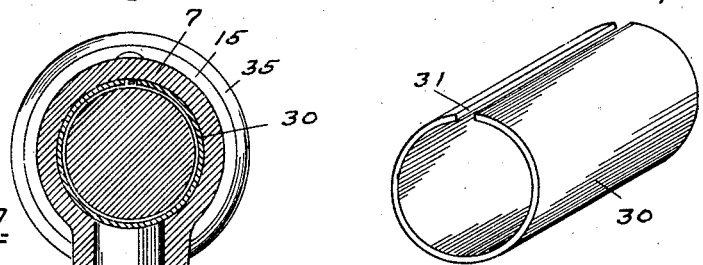
Fig.2.
Fig.3.
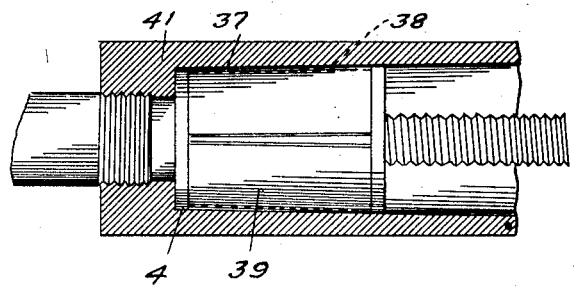
Fig.4.
INVENTORS.
Albert Otto
BY William Otto
Rich. N. Manning
ATTORNEY

UNITED STATES PATENT OFFICE.

ALBERT OTTO AND WILLIAM OTTO, OF KANSAS CITY, MISSOURI, ASSIGNORS OF ONE-HALF TO FRANCIS E. SCOTT AND GLENN BUTLER, BOTH OF KANSAS CITY, MISSOURI.

AIR AND GAS VALVE.

1,339,665.      Specification of Letters Patent.      Patented May 11, 1920.

Application filed May 27, 1919. Serial No. 300,089.

*To all whom it may concern:*

Be it known that we, ALBERT OTTO and WILLIAM OTTO, citizens of the United States of America, residing at Kansas City, in the county of Jackson and State of Missouri, have invented certain new and useful Improvements in Air and Gas Valves; and we do hereby declare that the following is a full, clear, and exact description of the invention, reference being had to the accompanying drawings, forming a part of this specification.

The invention has for its object, a valve which will resist wear and is rendered more efficient under expansion from heat, hence may be employed for all purposes whether in resisting water pressures or the pressures from steam ammonia and gases of various kinds, and compressed air. The invention consists in the novel construction and combination of parts hereinafter fully described and specifically pointed out in the claims.

In the drawings:

Figure 1 is a longitudinal sectional view of the valve casing showing the novel valve in a closed position and the inlet and outlet openings closed by the valve.

Fig. 2 is a vertical sectional view taken through the valve casing and valve and the inlet opening on line 2—2 on Fig. 1.

Fig. 3 is a detail view in perspective of the expansion valve sleeve.

Fig. 4 is a horizontal sectional view of the valve casing and valve showing an alternate construction of casing and valve.

Similar numerals of reference indicate corresponding parts in all the figures of the drawings.

Referring to the drawings 7 indicates the valve casing and 8 the valve chamber which extends from the forward end of the casing to within a short distance of the rear end of said casing and having precisely the same circumference.

Inwardly a short distance from the rear end of the casing the chamber 8 is reduced in circumference to form a shoulder or valve seat 9 and the outlet or discharge opening 10 for the passage of the liquid or fluid from the chamber.

12 indicates the inlet opening to the chamber 8 which is located at a point equi-distant from the ends of the casing 7, from the side of which casing and extending around which opening is integrally connected the inner end of a neck or tube 13.

The forward end of casing 7, is externally screw threaded at 14 and fitted to said screw threaded end is the internally screw threaded flange 15 on the cap 16. Integrally connected with the cap 16 is a collar or sleeve 17 internally screw threaded at 18, the screw threaded opening in the sleeve extending through the cap 16. The outer portion and forward end of the collar is screw threaded at 19 and fitted thereto is the internal screw threaded flange 20 on the cap 21. In cap 21 is an opening 22.

The valve consists of a solid cylindrical core piece or body 23 of the requisite degree smaller in circumference than that of the valve chamber 8 and approximately one half the length of said chamber. In the forward end of said core piece 23 is a screw threaded opening 25. 26 indicates a removable disk on the rear end of the core piece 23 having its circumference such as to contact frictionally with the inner circumference of the valve chamber 8. Integrally connected with the disk 26 is a screw threaded pin 27 which is fitted to the screw threaded opening 25 in the core piece 23. A small screw 28 is extended through the disk 26 and enters a screw threaded opening in the core piece or body 23 and prevents contrawise movement of the disk 26.

Upon the forward end of the core piece 23 and brazed thereon so as to form a rigid connection with the core piece 23 is a disk 29.

30 indicates the expansion sleeve as seen in Fig. 3 which is provided with a longitudinal opening or slot 31. This sleeve in length extends from the inner surface of disk 26 to the inner surface of disk 29 and extends concentric to and upon the outer circumference of the core piece 23, the outer circumference of the sleeve fitting closely against the inner circumference of the valve chamber 8 by its own outward expansion. Through the casing 7 is extended a screw 32 the inner end of which screw extends within the slot 31 of the sleeve 30 and keys the sleeve thereto and prevents any rotary movement of the sleeve.

33 indicates the valve stem or rod which is connected at its inner end integrally with the disk 29 and from said end the stem for a considerable distance outwardly is screw threaded at 34. The outer end of said stem extends through the screw threaded opening 18 of the sleeve 17 thence through the opening 22 in the cap 21 and is provided with a hand wheel 35.

Within the cap 21 is a packing 36 which binds upon the forward end of the collar 17.

In the application of the expansion sleeve to the core piece the cap 16 is removed from the casing 7 withdrawing the core piece from the valve chamber 8. The disk 9 is removed from the core piece and the sleeve 30, which in an expanded condition is larger than the core piece, is slipped over the core piece and the disk 26 replaced. Upon inserting the core piece with the sleeve 30 within the valve chamber the pressure inwardly upon the sleeve must be sufficient to partially close the slot 31 and when the core piece and sleeve are within the chamber the outward expansion of the sleeve insures close contact with the inner surface of the valve chamber, preventing any escape of gas past said surfaces.

The forward and rearward movement of the core piece and sleeve within the valve chamber is effected by the rotation imparted to the valve stem 33, in which movements, by a rotary movement given the wheel 35 to the left, the threaded portion 34 of the stem within the collar 17 causes a sliding movement outwardly of the core piece 23 away from the valve seat 9, the core piece rotating within the sleeve 30 to the left, until the core piece and sleeve have passed the inlet opening 12 for the air or gas a sufficient distance or into the position seen in dotted lines in Fig. 1 as will permit the entry of the volume of air or gas at the required velocity, whence it passes out of the discharge opening 10 from the valve chamber.

The advantage of the improved valve is that the sleeve 30 may be given a bearing surface with the inner surface of the valve chamber, and being preferably made from cast iron is not subject to corrosion when in the presence of ammonia and expands from heat. The movement of the wheel 35 and valve stem to the right closes the inlet opening 12 and the outlet opening 10, the disk 26 coming into close contact with the valve seat 9, hence both passages are practically gas tight.

The further resistance to gas pressures may be increased by decreasing the circumference of the valve chamber gradually from the forward to the rear end of the casing or so as to form a cone shaped chamber 37 as seen in Fig. 4, and similar to a faucet. In this form of the invention the core piece will be also cone shaped as seen in dotted lines at 38, and the sleeve 39 will be made conical, thus acting as a wedge when the disk 4 is in its seat. The slot 31 affords means for self lubrication. Such other modifications may be employed as are within the scope of the appended claims.

Having fully described our invention, what we now claim as new and desire to secure by Letters Patent is:

1. In air and gas valves the combination with the casing having a valve chamber of a valve member comprising a rotatable sliding core piece and a non-rotatable expansion member concentric to and upon the outer surface of said core piece.

2. The combination with the valve casing having a valve chamber, and with the inlet and outlet openings, of a valve, comprising a rotatable slidable body member, and a concentric non-rotatable member keyed within said chamber and movable with said body, and a valve stem for actuating the slidable body member and opening and closing both inlet and outlet openings.

3. The combination with the valve casing having a valve chamber and an outlet opening at one end and a valve seat surrounding said opening and having an inlet opening in the side between its respective ends, of a valve within said chamber comprising a slidable rotatable core piece having a fixed disk at one end and a removable disk at the other end, a longitudinally slotted expansion sleeve on said core piece retained between said disks, a fixed key in said valve chamber extending within said slot in the expansion sleeve, a cap on said valve casing and an internal screw threaded member on said cap and an externally screw threaded valve stem rigidly connected with the fixed disk on the core piece and extending through the internal screw threaded member of said cap.

4. The combination with the valve casing having a valve chamber and an outlet opening at one end and a valve seat surrounding said opening and having an inlet opening in the side between its respective ends, of a valve within said valve chamber consisting of a rotatable solid core piece having a fixed disk at its forward end and a detachable disk at its rear end, and a longitudinally slotted expansion sleeve on said core piece between said disks and a key device upon the said casing within said chamber extending within said slot in said sleeve, a cap on the forward end of said casing having an opening and a valve stem fixedly connected with the disk on the forward end of said core piece at its inner end and having its outer end extending through the opening in said cap.

ALBERT OTTO.
WILLIAM OTTO.